(12) United States Patent
Wagner

(10) Patent No.: US 7,819,948 B2
(45) Date of Patent: Oct. 26, 2010

(54) ROTARY VALVE

(75) Inventor: Glenn Paul Wagner, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 322 days.

(21) Appl. No.: 11/926,424

(22) Filed: Oct. 29, 2007

(65) Prior Publication Data

US 2009/0107332 A1    Apr. 30, 2009

(51) Int. Cl.
*B01D 59/26* (2006.01)
(52) U.S. Cl. .................. 95/100; 95/101; 96/130; 137/616.7; 251/56
(58) Field of Classification Search .................. 95/100, 95/101; 96/130; 137/616.7; 251/56
See application file for complete search history.

(56) References Cited

U.S. PATENT DOCUMENTS

| | | | | |
|---|---|---|---|---|
| 3,040,777 | A * | 6/1962 | Carson et al. .......... 137/625.15 |
| 3,479,006 | A * | 11/1969 | Brown ................... 251/174 |
| 4,326,567 | A * | 4/1982 | Mistarz ................. 141/90 |
| 4,569,371 | A * | 2/1986 | Dolejs et al. ........... 137/625.47 |
| 4,574,840 | A * | 3/1986 | Schumann et al. ...... 137/625.15 |
| 4,948,565 | A * | 8/1990 | Bemis et al. ........... 422/103 |
| 5,251,669 | A * | 10/1993 | Bishop ................. 137/625.23 |
| 5,406,041 | A * | 4/1995 | Hahn et al. ............ 200/61.86 |
| 5,820,656 | A | 10/1998 | Lemcoff et al. |
| 5,827,358 | A * | 10/1998 | Kulish et al. .......... 96/115 |
| 6,063,161 | A | 5/2000 | Keefer et al. |
| 6,234,417 | B1 * | 5/2001 | Sauder et al. .......... 242/381 |
| 6,311,719 | B1 | 11/2001 | Hill et al. |
| 6,457,485 | B2 * | 10/2002 | Hill et al. ............. 137/240 |
| 6,471,744 | B1 * | 10/2002 | Hill .................... 95/19 |
| 6,691,702 | B2 * | 2/2004 | Appel et al. .......... 128/202.26 |
| 2002/0124885 | A1 * | 9/2002 | Hill et al. ............. 137/312 |
| 2003/0116206 | A1 * | 6/2003 | Hartshorne et al. .... 137/625.46 |
| 2004/0035474 | A1 * | 2/2004 | Weiss ................... 137/624.11 |
| 2004/0094216 | A1 * | 5/2004 | Wagner ................ 137/625.46 |
| 2005/0199299 | A1 * | 9/2005 | Schick et al. ......... 137/625.46 |
| 2006/0102865 | A1 * | 5/2006 | Pervaiz ................ 251/286 |
| 2007/0028971 | A1 * | 2/2007 | Wagner ................ 137/625.15 |

OTHER PUBLICATIONS

U.S. Appl. No. 11/197,859, filed May 8, 2005, Wagner, Glenn Paul.

* cited by examiner

*Primary Examiner*—Robert J Hill, Jr.
*Assistant Examiner*—Christopher P Jones
(74) *Attorney, Agent, or Firm*—Anne B. Kiernan; John M. Fernbacher

(57) ABSTRACT

A rotary valve is disclosed having a rotor and stator that utilizes at least one compression spring to provide contact between the rotor and stator. The spring(s) is configured to oppose the pressure forces that urge the rotors and stators apart and reduce the amount of torque necessary to turn the rotors in the valve while preventing leakage from between the rotor and stator. The spring(s) may be positioned within the valve by a spring locating features.

15 Claims, 6 Drawing Sheets

ROTARY VALVE

BACKGROUND OF THE INVENTION

This invention relates generally to a rotary valve, and more particularly, to a rotary valve for pressure swing absorption systems.

Rotary valves are widely used in the process industries for directing fluids from one or more process sources to one or more process destinations in repeatable cyclic process steps. These valves, also called rotary sequencing valves, are used in cyclic or repeatable processes, such as gas separation by pressure or temperature swing adsorption, liquid separation by concentration swing adsorption, gas or liquid chromatography, regenerative catalytic processes, pneumatic or hydraulic sequential control systems, and other cyclic processes.

A widely used type of rotary valve has a planar circular configuration in which a flat, ported rotor rotates coaxially on a flat, ported stator such that ports in the stator and rotor are either aligned or blocked in a predetermined cyclic sequence. Sealing typically is provided by direct contact mating of the flat rotor face over the flat stator face. A high degree of precision is required in the fabrication of these flat surfaces to prevent excessive leakage at the mating surfaces. Rigid materials such as metals, ceramics, and/or carbon are typically are used for these rotors and stators, but wear of the parts or distortions caused by temperature differentials may cause changes in the shape of the surfaces, thereby allowing leakage across the seal formed between the surfaces.

Rotary valves with a flat rotating circular seal configuration are particularly useful in pressure swing adsorption (PSA) systems utilizing multiple parallel adsorber beds operating in overlapping cyclic steps that include feed, pressure equalization, depressurization, purge, and repressurization steps. In a typical application, a stator having multiple ports is used to connect feed gas and waste gas lines with the feed ends of a plurality of adsorber beds and also to connect the product ends of the plurality of the beds to provide pressure equalization, purge, and other bed-to-bed transfer steps. A rotor having multiple ports sealably rotates on the stator such that the openings on the stator face register sequentially with openings in the rotor face as the rotor rotates to direct gas flow for the desired PSA process cycle steps.

In a typical PSA cycle, the internal passages of the rotary valve are at different pressures as the PSA cycle proceeds. When the PSA cycle includes process steps at positive pressure and under vacuum, leakage driven by the pressure differentials between the valve ports connected to the feed and product ends of the beds may lead to various operating problems if leaks occur between these ports.

Rotary sequencing valves, in which a flat, ported rotor rotates coaxially on a flat, ported stator such that ports in the stator and rotor are aligned or blocked in a predetermined cyclic sequence, are used for directing fluids in cyclic processes having a number of repeatable steps. In U.S. patent application Ser. No. 11/197,859 (hereinafter referred to as the '859 application) filed May, 8, 2005, the disclosure of which is incorporated by reference in its entirety, a dual rotor/stator rotary valve system is disclosed that uses a single axially aligned spring to assist in mating a rotor surface against a stator surface to assist in sealing the rotor and stator surfaces against one another and prevent leakage between stator and rotor ports. The rotor ports are located at different circumferential positions on the rotor faces and operate at different pressures.

During operation of the prior art rotary valve disclosed in the '859 application, the difference in the port pressures results in a non-axial force across the rotor and stator mating face. When high operating pressures are required, large spring forces may be required to seal the rotors against the stators and prevent leakage. The amount of force necessary to turn the rotors will be directly related to the amount of force the spring compresses the rotors against the stators. If high spring forces are required to prevent leakage between the rotor and stator, large forces will be required to turn the rotors. These large forces increase rotor wear, require larger rotor motors, and increase rotor bearing wear.

The general arrangement of an exploded view of prior art rotary valve 1, such as found in the '859 application, is shown in FIG. 1. In actual operation, the components of the valve 1 are in contact with one another. As can be seen in FIG. 1, the prior art rotary valve 1 includes a feed stator 10, a feed rotor 20, a product rotor 30, a product stator 40, and a compression spring 50. In this exemplary prior art embodiment, the feed rotor 20 and the product rotor 30 are contained within a housing formed by the feed stator 10 and the product stator 40 as shown in FIG. 1.

In a pressure swing adsorption (PSA) process, adsorber beds (not shown) are connected to the ports 11a, 11b, 11c, 11d of the feed stator 10 and the ports 41a, 41b, 41c, 41d of the product stator 40. The feed end of the beds (not shown) are typically connected to ports 11a, 11b, 11c, 11d of the feed stator 10, and the product ends of the beds (not shown) are typically connected to the corresponding ports 41a, 41b, 41c, 41d of the product stator 40.

As can be seen in FIG. 1, the feed rotor 20 and the product rotor 30 are configured to mate and interlock. The compression spring 50 is disposed between the feed rotor 20 and the product rotor 30. The compression spring 50 presses the feed rotor 20 against the feed stator 10 to seal the feed rotor 20 against the feed stator 10. The compression spring 50 similarly presses the product rotor 30 against the product stator 40 to seal the product rotor 30 against the product stator 40.

The known valve 1 further includes a drive shaft 60 capable of rotating the feed rotor 20 and the product rotor 30. Drive shaft 60 includes a positive drive end 62 that is configured to engage a mating feature (not shown) in the feed rotor 20 in such a manner that when drive shaft 60 is rotated, feed rotor 20 and product rotor 30 are likewise rotated about an axis perpendicular to the rotor face, and slots within the feed rotor 20 and the product rotor 30 are aligned with ports in the feed stator 10 and the product stator 40, respectively, to select a predetermined connection of process lines.

The known rotary valve 1 includes various fluid ports and passages, the function of which are more fully disclosed in the '859 application. The operation of a specific cyclic process, such as PSA, need not be completely explained herein to understand the valve operation, and would be understood by one of ordinary skill in the art. In general, process operations include altering the rotated position of the feed rotor 20 and the product rotor 30 of the known valve 1 to allow for select fluid steams to be cycled. A general description of the operation of the prior art rotary valve 1 will now be provided.

As the feed rotor 20 and the product rotor 30 are rotated to predetermined positions, ports in the rotor faces are aligned with ports in their respective stators, allowing flow to and from the valve 1 through a predetermined connective path. In such a manner, fluid may flow between the beds connected to the feed stator 10 and product stator 40 as necessary for equalization, purge, or other cyclic process steps.

In a PSA process, the pressure in the beds alternates between high pressures and low pressures where adsorption and desorption take place, respectively. During process operations, the pressures within each slot exert a force on the feed rotor 20 and the product rotor 30, urging them away from the feed stator 10 and the product stator 40, respectively. For this reason, compression spring 50 is required to hold the feed rotor 20 against the feed stator 10 and the product rotor 30 against the product stator 40 to prevent leakage. Because the spring force and the pressure forces within the slots are not symmetric about the center or rotation of the rotors, the resultant force on the rotors is not located at the center of both the feed rotor 20 and the product rotor 30. This asymmetric force load results in a need for an increased spring force necessary to maintain rotor/stator contact, as well as increased torque required to actuate the valve and turn the shaft 60.

FIGS. 2A, 2B and 2C show simplified views of the forces acting on a rotor 200 of a rotary valve during a typical PSA cyclic process. The center axis of rotation of the rotor 200 is indicated by the vertical dashed line A'. The spring force $F_1$ is the force exerted by a spring (not shown) on the rotor 200 as it pushes the rotor 200 against a stator (not shown). The pressure force $F_2$ is the resultant force from the pressures in the various ports. The reaction force $F_3$ is the difference between the spring force $F_1$ and the pressure force $F_2$. $F_3$ is also the contact force between the rotor 200 and the stator (not shown). The reaction force $F_3$ is not located at a single point. The reaction force $F_3$ is distributed along the rotor 200 in some manner, which may be very complicated, depending on the flatness of the mating faces, the magnitude of the force, and the slight deformation of the rotor 200 caused by the applied loads. However, for simplicity, this distributed force may be resolved into the single resultant reaction force $F_3$. There must always be a non-zero reaction force $F_3$ if the rotor 200 and stator (not shown) are to remain in contact. If the reaction force $F_3$ is zero or less, then the pressure force will begin to separate the rotor 200 from a stator, and leaks will occur between various ports of the rotor and stator (not shown). It is the reaction force $F_3$ that is responsible for friction torque between the rotor and stator, through both its magnitude and location, and determines the amount of torque necessary to turn the rotor 200.

FIG. 2A shows the forces acting on the rotor 200 if the pressure force $F_2$ is located at the center of the rotor 200. In this example, all of the forces are collinear, and the reaction force $F_3$ is the difference between the spring force $F_1$ and the pressure force $F_2$. This result only happens if the pressure force $F_2$ is a resultant of a symmetrically balanced pressure forces around the rotor 200. This symmetrical distribution does not exist since the pressures of the various slots of the rotor 200 will not result in a net pressure force acting at the center of the rotor 200 during typical PSA process operations.

FIG. 2B shows the distribution of forces acting on the rotor 200 when the pressure force is not located at the center of the rotor 200, as would occur during typical PSA process operations. Similar to the discussion of FIG. 2A above, the reaction force $F_3$ is the difference between the spring force $F_1$ and the pressure force $F_2$, but now, in order to maintain equilibrium on the rotor 200 to keep the moments in balance, the reaction force $F_3$ must also shift from the center of the rotor 200 to a radial position away from the rotor center. The location and magnitude of the reaction force $F_3$ depends on the locations and magnitudes of the spring force $F_1$ and the pressure force $F_2$. Also, since the spring force $F_1$ must be equal to the sum of the pressure force $F_2$ and the reaction force $F_3$, the spring force $F_1$ must always be greater than the pressure force $F_2$ whenever the spring force $F_1$ and pressure force $F_2$ are not collinear.

When the spring force $F_1$ and pressure force $F_2$ are not collinear, they produce a bending moment 210 in the rotor 200 as indicated by the dashed line in FIG. 2B. The bending moment 210 may deform the rotor 200 if the forces are of sufficient magnitude for a particular rotor material and thickness. In some applications, this deformation may be maintained small enough to prevent leakage by making the rotor more rigid, either through the use of more rigid materials, or by increasing the rotor thickness. For larger rotors, this may become impractical. Additionally, the eccentricity of $F_3$ will increase the torque required to turn the rotor 200 during process operations.

Thus, it would be desirable to relocate the spring force $F_1$ as shown in FIG. 2C to a predetermined radial distance from the center axis of rotation A', opposite the pressure force $F_2$, to eliminate the bending moment in the rotor 200. The reaction force $F_3$ would then be acting in the same position as the pressure force $F_2$. This rearrangement results in the lowest required spring force $F_1$ and reaction force $F_3$ and a lower torque necessary to turn the rotor 200.

Even in applications when the bending moment and deflection are not of significant concern, the torque required to turn the motor and rotate the rotors may be a significant concern, especially when high pressures are present in the rotor ports. Usually, it is desirable to keep this torque to a minimum, since reducing torque reduces the size and/or increases the life of the motor and gear drive necessary to turn the rotor.

Thus, there is a need for a rotary valve that is capable of operating without leakage and having a reduced torque required to rotate the valve rotor.

This invention provides for a rotary valve capable of operating under such conditions without substantial leakage and with minimum torque required to turn the rotor. Other features and advantages of the present invention will be apparent from the following more detailed description of the preferred embodiments, taken in conjunction with the accompanying drawings that illustrate, by way of example, the principles of the invention.

BRIEF SUMMARY OF THE INVENTION

A rotary valve having a rotor and a stator in a sealed sliding rotary motion is disclosed. The rotary valve includes compression springs configured to reduce the amount of torque required to rotate the rotors while preventing leakage. The valve may be used in a cyclic processes including a PSA process for directing fluids from one or more process sources to one or more process destinations in repeatable cyclic process steps.

An embodiment of the invention is disclosed that provides for a rotary valve for performing cyclic process operations including a feed stator having a feed stator mating surface, a feed stator rear surface, and a plurality of ports connecting between the feed stator mating surface and the feed stator rear surface; a feed rotor adjacent to the feed stator having a feed rotor mating surface, a feed rotor rear surface, and a plurality of ports disposed upon the feed rotor mating surface to direct fluid flow between the plurality of stator ports of the feed stator, the feed rotor rotatable about an axis perpendicular to the feed rotor surface; a product rotor engaged with the feed rotor and having a product rotor mating surface, a product rotor rear surface, a product outlet, and a plurality of ports disposed upon the mating surface to direct fluid flow between the plurality of ports of the product stator, the product rotor rotatable about an axis perpendicular to the product rotor face; a product stator adjacent to the product rotor comprising a product stator mating face, a product stator rear face, and a plurality of ports connecting between the product stator mating face and the product stator rear face; and at least one compression spring disposed between the feed rotor and the product rotor configured to apply a spring force with a center of force on the feed rotor rear face and the product rotor rear face. The spring force is configured to minimize torque to turn the feed rotor and the product rotor when the valve is operational.

The feed rotor and the product rotor of the rotary valve are configured to rotate about a center axis of rotation, and the spring force center of force is located at a predetermined distance greater than zero from the axis of rotation.

The rotary valve may further include at least one spring locating feature positioned on the feed rotor rear face opposite at least one spring locating feature located on the product rotor rear face configured to secure the at least one compression spring between the feed rotor and the product rotor at a fixed position. More generally, any number of spring locating features may be located on the feed rotor rear face opposite a similar configuration on the product rotor rear face.

Another embodiment of the invention is disclosed that provides for a rotary valve for performing cyclic process operations including a stator housing having ports, a rotor comprising ports and a rear surface, the rotor in rotatable contact about a center axis of rotation with the stator housing at an interface, at least one compression spring having a spring force center of force disposed between the rotor rear surface and a thrust runner; and a thrust bearing disposed between the thrust runner and the stator housing. The rotary valve further includes having the at least one compression spring apply a spring force configured to minimize torque required to turn the rotor for the given spring force when the valve is operational.

The rotary valve further includes having the spring force center of force located at a predetermined distance greater than zero from the axis of rotation, and having at least one spring locating feature on the rotor rear surface to position the at least one compression spring. The rotary valve may further include having two or more spring locating features on the rotor rear surface opposite two or more spring locating features located similarly on the thrust runner to secure and position two or more compression springs between the feed rotor and the thrust runner at a fixed position.

Another embodiment of the invention is disclosed that provides for a pressure swing adsorption system including a plurality of absorption beds and a rotary valve having one or more rotors, the rotary valve connected to the plurality of absorption beds and configured to direct flows to the plurality of absorption beds during the pressure swing absorption process.

The rotary valve includes one or more rotors configured to rotate about an axis of rotation; and at least one compression spring having a spring force with a center of force configured to apply the spring force to the one or more rotors that minimizes the torque required to turn the one or more rotors for the spring force applied.

The pressure swing adsorption system may include a feed stator having a feed stator mating surface; a feed stator rear surface; and a plurality of feed stator ports connecting between the feed stator mating surface and the feed stator rear surface; and the one or more rotors include a feed rotor engaged with a product rotor. The feed rotor includes a feed rotor mating surface, a feed rotor rear surface, and a plurality of feed rotor ports disposed upon the feed rotor mating surface to direct fluid flow between the plurality of feed stator ports, the feed rotor configured to rotate about an axis of rotation perpendicular to the feed rotor face. The product rotor includes a product rotor mating surface, a product rotor rear surface, a product outlet, and a plurality of product rotor ports disposed upon the mating surface to direct fluid flow between the plurality of product stator ports. The product rotor is configured to rotate about an axis of rotation perpendicular to the product rotor face. The product stator includes a product stator mating face, a product stator rear face, and a plurality of ports connecting between the product stator mating face and the product stator rear face in rotatable contact with the product rotor.

The at least one compression spring disposed between the feed rotor and the product rotor applies a spring force having a center of force on the feed rotor rear face and the product rotor rear face which results in minimum torque to turn the rotors for the spring force when the valve is operational. The spring force center of force is located at a predetermined distance greater than zero from the center axis of rotation. The at least one spring locating feature positioned on the feed rotor rear face is aligned opposite the at least one spring locating feature positioned on the product rotor rear face. The spring locating feature(s) is configured to secure the compression spring(s) between the feed rotor and the product rotor at a fixed position. The pressure swing absorption system may further include two or more spring locating features located on the feed rotor rear face opposite two or more spring locating features located similarly on the product rotor rear face to secure and position two or more compression springs between the feed rotor and the product rotor at a fixed position.

Alternatively, the pressure swing adsorption system may include a stator housing having ports; a rotor comprising ports and a rear surface, the rotor in rotatable contact with the stator housing at an interface about a center axis of rotation; a thrust bearing in contact with the stator housing; a thrust runner in contact with the thrust bearing; and at least one compression spring disposed between the rotor rear surface and the thrust runner. The at least one compression springs is configured to apply a spring force having a center of force on the rotor which results in minimum torque to turn the rotor for the given spring force when the valve is operational. The spring force center of force is located at a predetermined distance greater than zero from the center axis of rotation.

At least one spring locating feature is positioned on the rotor rear face opposite and aligned with at least one spring locating feature positioned on the thrust runner. The spring locating features are configured to secure and position compression springs between the rotor and the thrust runner.

Further aspects of the method and apparatus are disclosed herein. Other features and advantages of the present invention will be apparent from the following more detailed description of the preferred embodiment, taken in conjunction with the accompanying drawings that illustrate, by way of example, the principles of the invention.

DETAILED DESCRIPTION OF THE INVENTION

The present invention now will be described more fully hereinafter with reference to the accompanying drawing, in which a preferred embodiment of the invention is shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The exemplary embodiments of the present invention address the operation of a rotary valve that may be utilized in a pressure swing absorption (PSA) system operating in cycles by rotating a rotor within the rotary valve. The PSA systems include PSA systems having pressures that are super-atmospheric or sub-atmospheric or a combination of super- and sub-atmospheric. The exemplary embodiments of the invention provide for an improved rotary valve design and method of configuring a rotary valve that reduces the amount of torque necessary to turn the rotary valve.

Figure 3:
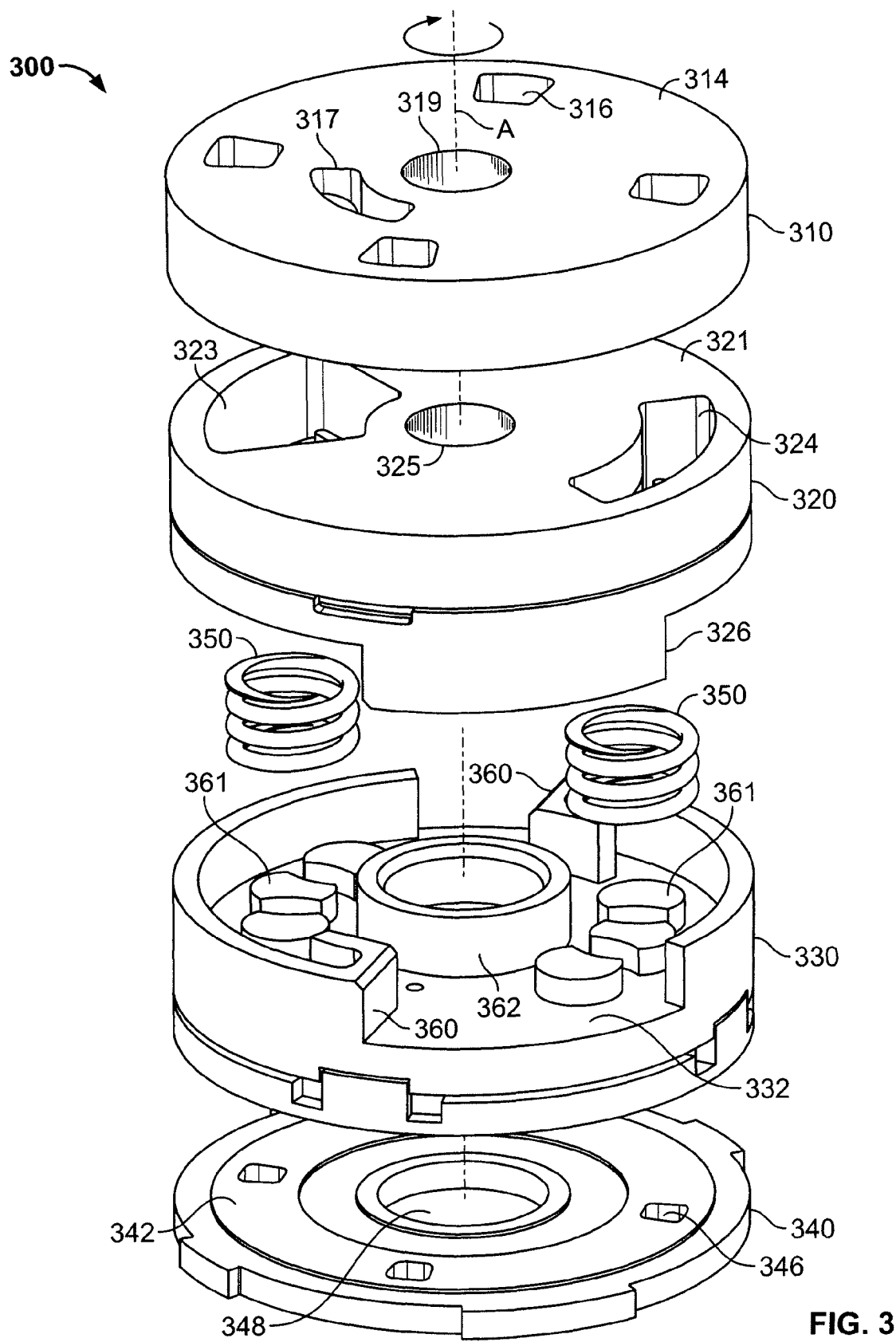
FIG. 3 is an expanded top view of exemplary embodiment of a rotary valve according to the invention.
Figure 4:
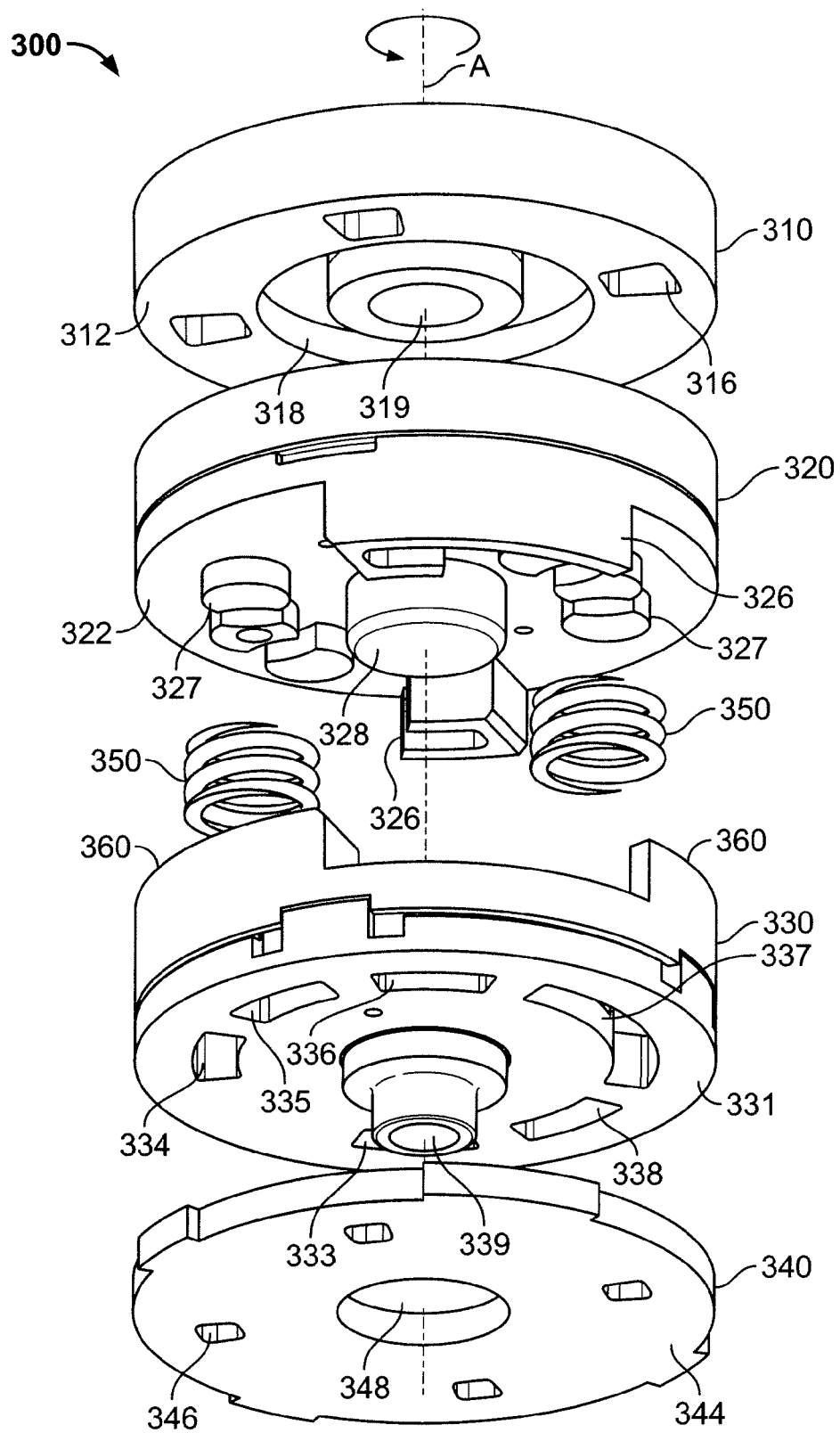
FIG. 4 is an expanded bottom view of an exemplary embodiment of a rotary valve according to the invention.

An exemplary embodiment of the invention is illustrated by a two rotor, two stator rotary valve 300 as shown in FIGS. 3 and 4. Rotary valve 300 may be used, for example, in a PSA system for recovering oxygen from air utilizing four absorbent beds and a PSA cycle in which each bed proceeds through the steps of (1) making product, (2) feed/make product and provide product repressurization gas, (3) pressure equalization down, (4) provide purge, (5) evacuation, (6) receive purge, (7) pressure equalization up, and (8) receive product repressurization gas. The various ports of the rotary valve 300 would be similarly connected to the PSA system as disclosed in the '859 application, incorporated herein by reference in its entirety. Additionally, the PSA system operations, including the valve 300 operations, would be similar to the disclosed operations of the '859 application and are incorporated herein in the entirety by reference.

A general arrangement of an exploded view of an exemplary embodiment of a rotary valve 300 according to the present invention is shown in FIGS. 3 and 4. FIG. 3 is a top perspective view of the rotary valve 300, and FIG. 4 is a bottom perspective view of the valve 300. The rotary valve 300 includes a feed stator 310, a feed rotor 320, a product rotor 330, a product stator 340, and two compression springs 350. The rotary valve 300 has a center axis A.

The feed stator 310 includes a mating surface 312 and a rear surface 314. The feed stator 310 further includes a plurality of ports 316 connected via various lines (not shown) to the feed ends of the process beds (not shown). The feed stator 310 also includes a material feed port 319. The material feed port 319 would be connected to a feed line (not shown) to provide a feed gas to the feed stator 310. The material feed port 319 also allows for a drive shaft (not shown) to pass through the feed stator 310 to the feed rotor 320. The feed stator 310 also includes a waste port 317 that would be connected to a vacuum line (not shown). The waste port 317 is connected to annular groove 318.

The feed rotor 320 includes a mating surface 321 and a rear surface 322. the mating surface 321 of the feed rotor 320 is in rotatable contact with the mating surface 312 of the feed stator 310. The feed rotor further includes an evacuate/purge port 323, a feed port 324 and an opening 325 on the mating surface 321. The material feed port 319 of the feed stator 310 provides feed gas to the opening 325, which is connected via internal passageway (not shown) to feed port 324. The opening 325 also allows a drive shaft (not shown) passing through the material feed port 319 of the feed stator 310 to pass into the feed rotor 320 to be engaged by a boss 328. It should be noted that material feed port 319 and opening 325 are sized to allow feed gas to flow through the port 319 and opening 325 when the drive shaft (not shown) is present.

The evacuate/purge port 323 is configured to always be in fluid communication with the annular groove 318 of the feed stator 310. When the evacuate/purge port 323 is positioned over one of the plurality of ports 316 in the feed stator 310, gas from a bed (not shown) will flow through the port 316, into the evacuate/purge port 323, then into the annular cavity 318, and finally into waste port 317, from which the gas is exhausted by the vacuum system (not shown). The feed rotor rear surface 322 includes drive lugs 326. The drive lugs 326 transfer torque to the product rotor 330. The feed rotor 320 is configured to rotate about the axis A with the transfer of torque to the feed rotor 320 from a drive shaft (not shown) engaged within a boss 328.

As shown in FIGS. 3 and 4, the feed rotor 320 of this exemplary embodiment has six spring locators 327 positioned opposite six spring locators 361 on the product rotor 330. The six spring locators 327 positioned on the feed rotor 320 consist of two groups of three locating features located symmetrically with respect to a plane passing through the axis of rotation. The spring locators 361 positioned on the product rotor 330 are located opposite the spring locators 327 on the feed rotor 320 and are located similarly. In general, any number of spring locating features in any arrangement may be used to achieve a desired spring force and position the resultant spring force at the required location.

The spring locators 327 secure at least one compression spring between the feed rotor 320 and the product rotor 330 at a fixed position. As shown in this embodiment, two springs 350 are positioned by two spring locators 327 on the feed rotor 320 opposite two spring locators 361 on the product rotor 330. The two spring locators on the feed rotor 320 are located symmetrically with respect to a plane passing through the axis of rotation. The corresponding opposite two spring locators on the product rotor 330 are located similarly. In general, it should be understood that any number of locating features 327, 361 may be located on the rotors 320, 330 to allow for a different number and placement of the springs 350 around the center axis A. Furthermore, any number of springs 350 having known spring force may be selected and positioned at locating features 327, 361 as long as they achieve a desired total spring force and resultant center of force to minimize the amount of torque to required to turn the rotors 320, 330 while providing a force to seal the rotors 320, 330 against the stators 310, 340, respectively, to prevent substantial valve leakage. Additionally, while the locating features 327, 361 are shown as raised material, the locating features may alternatively be depressions or other shapes that locate and position the springs 350 upon the rotor rear surface.

The feed stator 310 and the feed rotor 320 are configured to be mated as shown in FIGS. 3 and 4. When mated, the feed stator mating surface 312 is in rotatable contact and sealed with the feed rotor mating surface 321 by the force of springs 350. The seal between the feed stator mating surface 312 and the feed rotor mating surface 321 allows operation of the valve 300 substantially without leakage between the feed stator 310 and the feed rotor 320. The term substantially without leakage, used herein and otherwise throughout this disclosure, is intended to include a small and operationally acceptable amount of leakage. For example, leakage of less than 1% of flow may be acceptable for certain operations, while leakage of less than 5% of flow may be acceptable under different operating conditions.

As can be seen in FIGS. 3 and 4, by rotating the feed rotor 320 about axis A, a feed gas may be provided to the feed port 319 of the feed stator 310 and distributed to a selected port(s) 316 in the feed stator 310 via the central feed port 325 and the feed port 324 of the feed rotor 320. The complete valve operation in an exemplary PSA cycle is not further explained herein, as the operation is provided in the '859 application and incorporated by reference in the entirety herein.

The product rotor 330 includes a mating surface 331 and a rear surface 332. The product rotor 330 further includes a provide purge port 333, a receive purge port 334, an equalization up port 335, a product repressurization port 336, a product port 337, and an equalization down port 338. The product port 337 is connected by an internal passageway (not shown) to a central cavity (not shown) that is connected to product outlet 339. The various ports (333, 334, 335, 336, 337, 338) are disposed upon the mating surface 331 and are connected by internal passageways (not shown) to one another and/or to the product outlet 339 as is disclosed in the '859 application and which is incorporated herein in the entirety by reference.

The rear surface 332 of the product rotor 330 includes drive lugs 360 and spring locators 361. The drive lugs 360 of the product rotor 330 are configured to mate with the drive lugs of the feed rotor 326 as shown in FIGS. 3 and 4. Torque is transferred from the drive lugs 326 of the feed rotor 320 to the drive lugs 360 of the product rotor 330 to rotate the product rotor 330 about axis A. Other drive lug geometries may be used to engage the feed rotor 320 to the product rotor 330. The rear surface 332 also includes a ring feature 362 for receiving the boss 328 of the feed rotor 320 when the feed rotor 320 and the product rotor 330 are engaged.

The product stator 340 includes a mating surface 342 and a rear surface 344. The product stator further includes ports 346 connecting between the mating surface 342 and the rear surface 344. The ports 346 are connected to product lines (not shown), which are connected to the product ends of adsorber beds (not shown) as known in the art. The product stator 340 further includes a central opening 348 configured to receive the product outlet 339 of the product rotor 330.

The product stator 340 and the product rotor 330 are configured to be mated as shown in FIGS. 3 and 4. When mated, the product stator mating surface 342 is in rotatable contact and sealed against the product rotor mating surface 331 by the force of springs 350. The seal between the product stator mating surface 342 and the product rotor mating surface 331 allows operation of the valve 300 substantially without leakage between the product stator 340 and the product rotor 330. As can be seen in FIGS. 3 and 4, as the product rotor 330 rotates, the various product rotor ports (333, 334, 335, 336, 337, 338) are aligned with stator product ports 346 to collect product, purge, or repressurize the adsorber beds (not shown) as described in the '859 application and incorporated herein in the entirety by reference.

Figure 1:
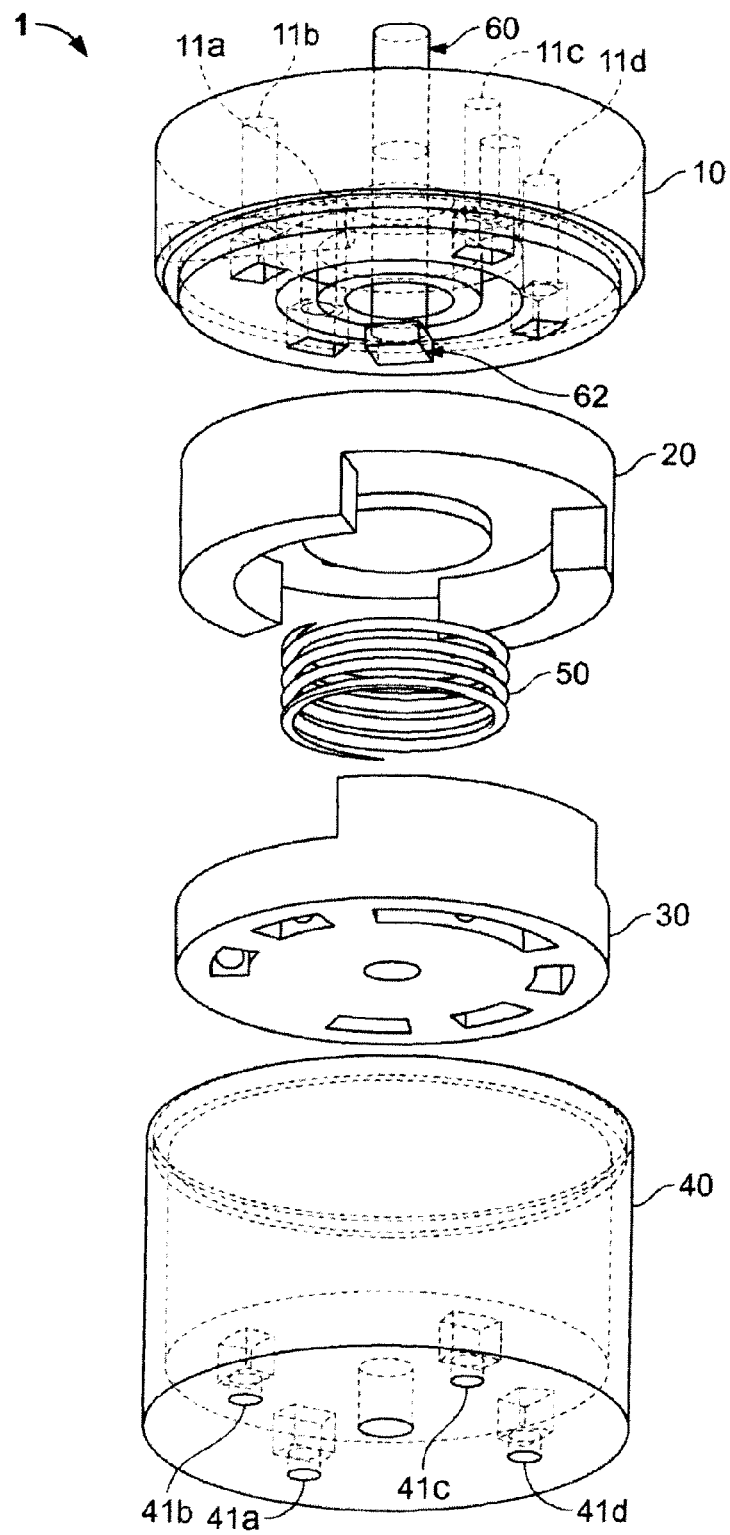
FIG. 1 shows an exploded view of an exemplary prior art rotary valve.

The valve 300 may be installed in a suitable housing (not shown) configured to support, connect, and seal the valve 300 as would be appreciated by one of ordinary skill in the art. Feed rotor 320 and product rotor 330 would be adapted to coaxially rotate within the housing (not shown) about axis A. Alternatively, a housing may be formed by modifying the feed stator 310 and/or the product stator 340 to form the valve chamber, as would be similarly appreciated by one of ordinary skill in the art. A drive shaft (not shown) would penetrate the sealed housing and traverse axially through the feed stator 310 and transmit torque to the feed rotor 320, similar to the arrangement as disclosed in FIG. 1. The drive shaft (not shown) would be driven by a motor (not shown) to rotate the feed rotor 320.

Feed rotor drive lugs 326 engage product rotor mating lugs 360 to transmit the rotary motion of feed rotor 310 to product rotor 320. The drive lugs 326 and mating lugs 360 also maintain angular alignment between the rotors so that as feed stator ports 316 are covered and uncovered by the feed rotor 320, the appropriate product stator ports 346 are also covered or uncovered by the stator rotor 330, simultaneously. The particular arrangement of the drive lugs 326 and mating lugs 360 is not critical, and other methods of alignment and coaxial drive are possible, such as, for example, by appropriate pins and/or sockets. The alignment and drive system is configured to transmit rotational movement from one rotor to the other, maintain angular alignment between the rotor parts, and allow the rotors to move axially with respect to one another so that they remain seated against their respective stators.

Figure 5:
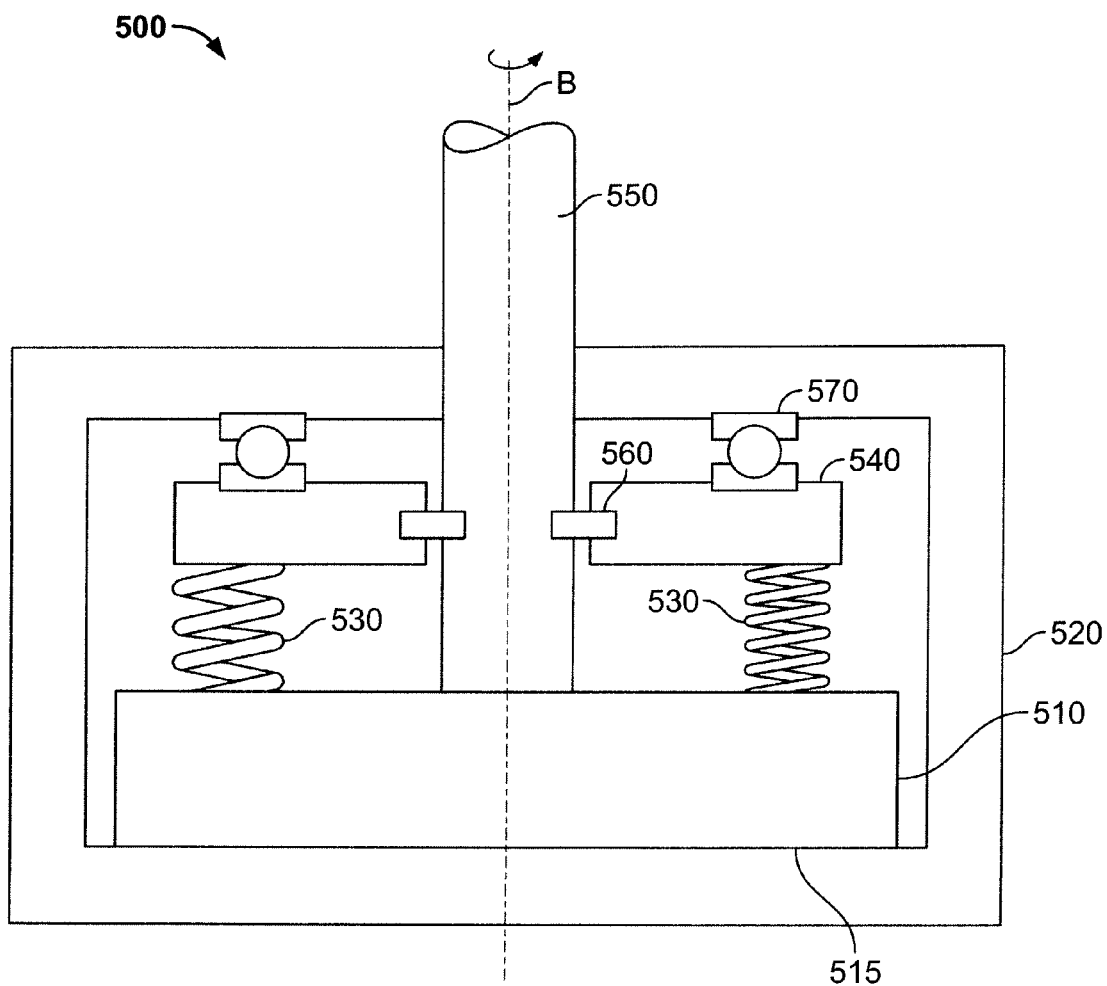
FIG. 5 is a cross sectional schematic of a single rotor embodiment of a rotary valve according to the present invention.

An exemplary embodiment of an alternative rotary valve 500 having a rotor 510 and a stator housing 520 is shown in FIG. 5. In this embodiment, the rotary valve 500 may be used as either a feed or product rotary valve. The ports (not shown) of the rotor 510 and the ports (not shown) of the stator housing 520 may be configured the same or similar to the corresponding feed and product rotor and stator ports of the rotary valve 300 as shown in FIGS. 3 and 4 and as discussed above when used in a PSA system process. Similarly, ports may be configured on the mating surfaces (not shown) of the rotor 510 and stator housing 520 the same or similar to the configurations on the mating surfaces of the rotors and stators of the rotary valve 300 as shown in FIGS. 3 and 4.

The rotary valve includes compression springs 530 that are held in place against the rotor 510 by a thrust runner 540. The thrust runner 540 is attached to a shaft 550 by pins 560. Alternatively, the pins 560 may be used to attach the thrust runner 540 to the rotor 510. A thrust bearing 570 is used between the thrust runner and the stator housing 520 to allow the thrust runner 540 to rotate about axis B when the shaft 550 is rotated. The thrust bearing 570 carries the spring force of the springs 530, while allowing the thrust runner 540 to rotate with a minimum amount of friction.

Springs 530 provide a spring force that maintains contact between the rotor 510 and stator housing 520 at interface 515. The rotor 510 is in rotatable contact with and sealed against the stator housing 520 at an interface 515. The spring force should be selected to be sufficient to prevent substantial leakage from the rotor and stator ports (not shown) at the interface 515 when the valve 500 is operated. The springs 530 are located on locating features (not shown) similar to those of rotary valve 300, discussed above. In this embodiment, two springs 530 having unequal spring force are shown disposed between the rotor 510 and the thrust runner 540.

An exemplary method of determining the magnitude and position of the resultant spring force to minimize the torque necessary to turn the rotor is now provided. The torque required to turn a rotor when the spring force is located at the center axis of the rotor is given by Equation 1:

$$\text{Torque} = \frac{2}{3}\mu FR, \text{ where} \quad (1)$$

μ=friction coefficient

Figure 2A:
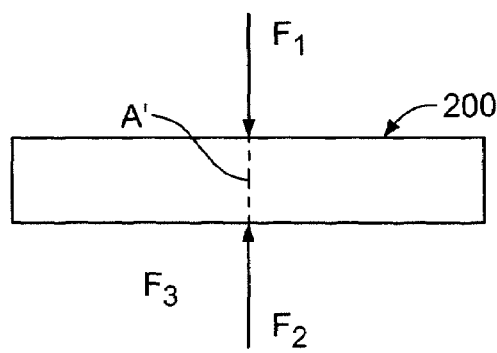
FIG. 2A illustrates a simplified overview of forces acting upon an exemplary rotor when pressure forces and spring forces are both located at the center of the rotor.
Figure 2B:
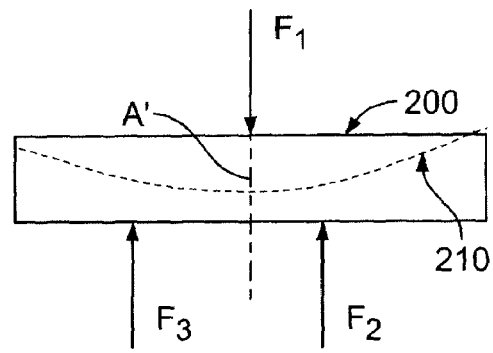
FIG. 2B illustrates a simplified overview of forces acting upon an exemplary rotor when the pressure force is not applied at the center of the rotor.
Figure 2C:
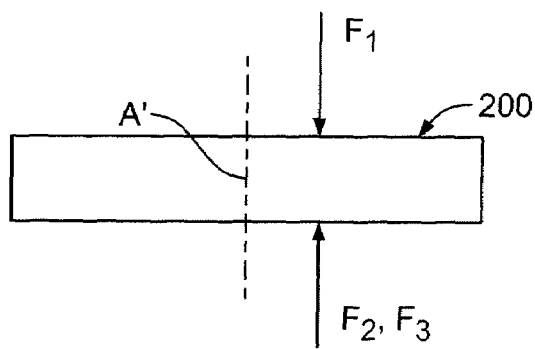
FIG. 2C illustrates a simplified overview of forces acting upon an exemplary rotor when the spring force is placed at the same location on the rotor as the pressure force.

F=contact force between rotor and stator ($F_3$ from FIG. 2)

R=radius of the rotor

Furthermore, it can be shown that if the contact force between the rotor and the stator is located at the edge of the rotor, the torque required to turn the rotor will be μFR.

To simplify the determination, it may be assumed that the torque required to turn the rotor is a linear function of the radius of the location of the contact force between the rotor and the stator. With this assumption, the torque required to turn the rotor is given by Equation 2:

$$\text{Torque} = \mu F\left(\frac{2R}{3} + \frac{r}{3}\right) \quad (2)$$

r=radius of the contact reaction force

From these calculations, it is evident that to minimize the torque required to turn the rotor, the reaction force should be located at the center of the rotor. However, because the resultant pressure force on the rotor will not be located at the center of the rotor because of the location of the various high and low pressure ports on the rotor, neither will the contact reaction force be located at the center.

Thus, to determine the magnitude and location of a spring force that minimizes torque while preventing leakage for a selected cyclic process having a known resultant pressure force, the following methodology is used:

(a) provide a rotary valve comprising one or more rotors having one or more spring locating features;

(b) determine the resultant pressure force having a magnitude and position acting on the one or more rotors for the pressure swing absorption process selected;

(c) select a spring force having a magnitude sufficient to seal the one or more rotors against leakage during the pressure swing absorption process;

(d) select a position for the spring center of force upon the one or more rotors;

(e) calculate the resultant contact force and location for the selected spring force and resultant pressure force;

(f) calculate the torque required to turn each rotor of the one or more rotors using Eq. 2;

(g) add the torque required to turn each rotor of the one or more rotors together to determine a total torque;

(h) repeat steps (d) through (g) to find the position for the spring center of force that results in the lowest total torque required to turn the rotor(s);

(i) position one or more springs on the spring locating features such that the total spring force is equal to the spring force selected in (c) and the location of the center of spring force is located as selected in (h);

(j) if the spring force is insufficient to seal the one or more rotors against leakage during the pressure swing absorption process, go back to (c) and incrementally increase the selected spring force until the valve operates without substantial leakage.

An example of calculating the spring position that results in minimum torque for an exemplary dual rotor/stator rotary valve operating under nominal PSA process conditions will now be provided. The pressures of the various slots were selected at a typical operating pressure during the PSA process.

Figure 6:
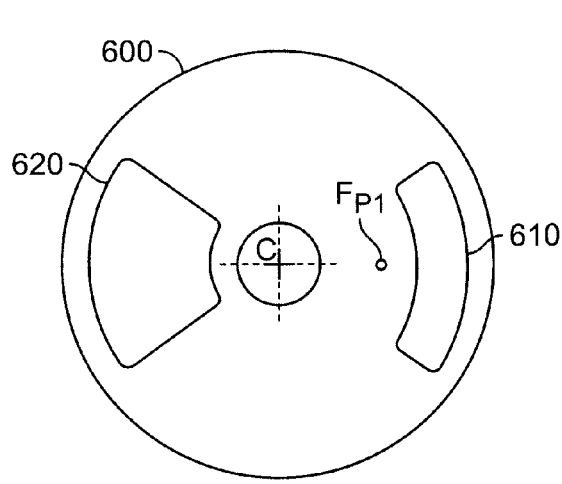
FIG. 6 is a view of the feed rotor face of an exemplary feed rotor according to the invention.

FIG. 6 shows an exemplary feed rotor 600 having a feed slot 610 and an evacuate/purge slot 620 on a surface 630. The rotor 600 has a radius R. For example, the radius R may be approximately 1 inch. The feed rotor 600 has a center axis C about which the feed rotor 600 would rotate when turned during process operations. The center axis C is aligned with the valve center axis A (FIGS. 3, 4). In the PSA process, the feed slot 610 operates at an average high pressure of 7 psig, and the evacuate/purge slot 620 operates at an average low pressure of −7 psig. The pressure in the feed slot 610, the pressure in the evacuate/purge slot 620, and the pressure on the other rotor surfaces results in a pressure force of approximately 6.8 pounds acting to separate the feed rotor 600 from the stator (not shown). This force acts at the location $F_{p1}$, as indicated in FIG. 6, offset from the center axis A by a distance d of approximately 0.5 inches.

Figure 7:
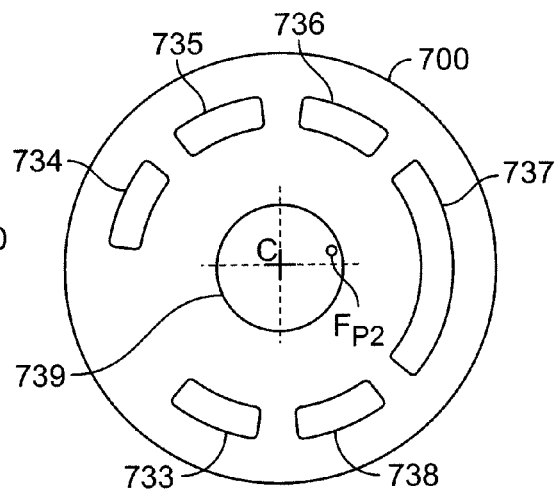
FIG. 7 is a view of the product rotor face of an exemplary product rotor according to the invention.

FIG. 7 shows an exemplary product rotor 700 having a provide purge port 733, a receive purge port 734, an equalization up port 735, a product repressurization port 736, a product port 737, and an equalization down port 738, and a center hole 739 to accommodate the rotor bearing and product outlet. The pressures in the slots (733, 734, 735, 736, 737, 738, 739 and other rotor surfaces results in a pressure force of approximately 9.3 pounds acting to separate the product rotor 700 from the product stator (not shown). This force acts on the product rotor 700 at the location $F_{p2}$ offset from the center axis C by a distance of approximately 0.3 inches as indicated in FIG. 7. The product slot 737 and the center hole 739 have the highest average operating pressure, approximately 7 psig followed by successively lower pressures in the product repressurization port 736, the equalization down port 738, the equalization up port 735, the provide purge port 733, and the receive purge port 734. The product rotor 700 has a center axis C about which the product rotor rotates when turned during process operations. The center axis C is aligned with the valve center axis A (FIGS. 3, 4).

Figure 8:
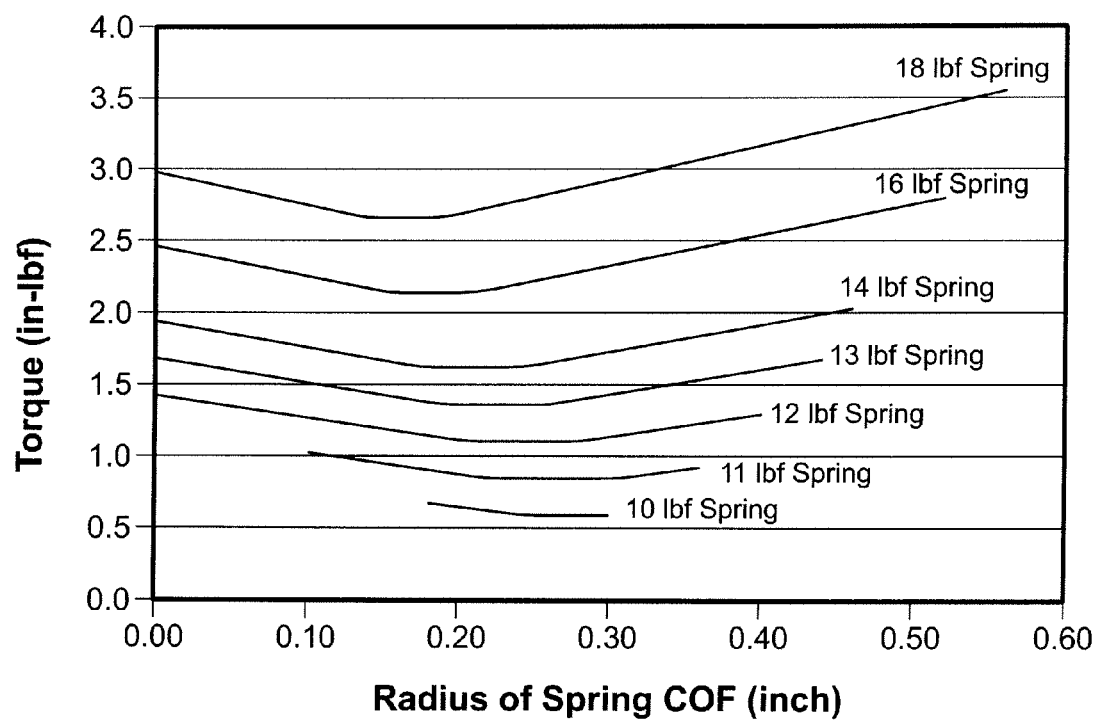
FIG. 8 is a graph illustrating the relationship between the radial location of the center of force of the spring force and the torque required to turn the rotor for various spring forces according to the present invention.

The results of determining the torque required to rotate the feed rotor 600 (FIG. 6) and the product rotor 700 (FIG. 7) for different spring forces and a range of radii of spring center of force (COF) are shown in FIG. 8. The horizontal axis is the radius or eccentricity at which the spring force is applied. The vertical axis is the torque required to turn both rotors. Each curve represents a different spring force as indicated.

The determination of the required spring force is performed by first determining the pressure force acting on the rotors. The determination of the pressure force is difficult for several reasons. First, the process pressures in the rotor ports are continuously changing as a result of changing pressures in the adsorber beds and changes in the rotor positions. Second, other fluctuations may occur in the rotor port pressures when reciprocating pumps are used to provide feed gas and vacuum to the system, which may cause pressure pulsations in some of the ports. Third, the pressure distribution on the face of the rotors at non-port locations is an estimate depending on the contact pattern between the rotor and stator faces, neither of which are perfectly flat. This non-flatness may allow some pressure to leak onto the rotor face and change the area over which the pressure exerts its force. Because of these reasons, it is difficult to determine what spring force will actually be required during operation. Ideally, the spring force would only have to be infinitesimally greater than the sum of the pressure and contact forces to keep the rotors and stators in contact. In actuality, a spring force is selected that is slightly larger by a few pounds than the sum of the pressure force and the contact force and the valve is observed for leakage. If the valve leaks beyond an acceptable amount for the application, the spring force is incrementally increased until substantial leakage is eliminated. Thus, by using FIG. 8, as the spring force is increased, the position of the resultant spring force is adjusted to maintain minimum torque required to turn the rotor.

The end points of each curve in FIG. 8 represent the point at which the reaction force occurs at the edge of one of the rotors. Beyond these end points, it is not possible to maintain static equilibrium of the rotors because the pressure force will begin to separate one of the rotor/stator pairs. FIG. 8 shows that for a given spring force, there is an optimum radial location at which to apply the spring force to minimize the torque required to turn the rotors. The radial location for minimum torque is not a constant, but varies with the applied spring force. As shown in FIG. 8, the optimum radius at which to locate the spring force decreases with increasing spring force. For the spring selection method previously described, increasing spring forces are tried until the valve leakage has been eliminated, and the optimum location of the spring center of force for a particular spring force is found from FIG. 8.

Springs of different force may be selected to achieve a predetermined total spring force and location. For example, rotors may have spring position locators positioned at several locations that allow for a placement of spring center of force based on a later determined application.

A general embodiment of the invention includes a rotary valve having pressurized feed air, vacuum waste or exhaust connections, and a product outlet, as well as ports for connecting to the feed and product ends of multiple adsorber beds. The valve may be used in any process for directing fluids from one or more process sources to one or more process destinations in repeatable cyclic process steps.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A rotary valve for performing cyclic process operations, comprising: a feed stator comprising a feed stator mating surface, a feed stator rear surface, and a plurality of ports connecting between the feed stator mating surface and the feed stator rear surface; a feed rotor adjacent to the feed stator comprising a feed rotor mating surface, a feed rotor rear surface, and a plurality of ports disposed upon the feed rotor mating surface to direct fluid flow between the plurality of stator ports of the feed stator, the feed rotor rotatable about an axis perpendicular to the feed rotor surface; a product rotor engaged with the feed rotor and comprising a product rotor mating surface, a product rotor rear surface, a product outlet, and a plurality of ports disposed upon the mating surface to direct fluid flow between the plurality of ports of the product stator, the product rotor rotatable about an axis perpendicular to the product rotor face; a product stator adjacent to the product rotor comprising a product stator mating face, a product stator rear face, and a plurality of ports connecting between the product stator mating face and the product stator rear face; and at least one compression spring disposed between the feed rotor and the product rotor configured to apply a spring force with a center of force on the feed rotor rear face and the product rotor rear face, wherein the spring force center of force is located at a predetermined distance greater than zero from the axis of rotation such that the spring force is configured to reduce torque required to turn the feed rotor and the product rotor when the valve is operational.

2. The rotary valve of claim 1, wherein the feed rotor and the product rotor are configured to rotate about a center axis of rotation.

3. The rotary valve of claim 1, wherein the spring force is configured to minimize torque required to turn the feed rotor and the product rotor when the valve is operational.

4. The rotary valve of claim 1, further comprising at least one spring locating feature positioned on the feed rotor rear face opposite at least one spring locating feature located on the product rotor rear face configured to secure and position the at least one compression spring between the feed rotor and the product rotor at a fixed position.

5. The rotary valve of claim 1, wherein two or more spring locating features are located symmetric with respect to a plane passing through the axis of rotation on the feed rotor rear face opposite two or more spring locating features similarly configured on the product rotor rear face to secure and position two or more compression springs between the feed rotor and the product rotor at a fixed position.

6. A rotary valve for performing cyclic process operations, comprising: a stator housing having ports; a rotor comprising ports and a rear surface, the rotor in rotatable contact about a center axis of rotation with the stator housing at an interface; at least one compression spring having a spring force center of force disposed between the rotor rear surface and a thrust runner; a thrust bearing disposed between the thrust runner and the stator housing; the at least one compression spring configured to apply a spring force having a center of force on the rotor rear surface and the spring force center of force is located at a predetermined distance greater than zero from the axis of rotation which results in reduced torque required to turn the rotor for the given spring force when the valve is operational.

7. The rotary valve of claim 6, wherein the spring force center of force results in minimum torque required to turn the rotor for the given spring force when the valve is operational.

8. The rotary valve of claim 6, further comprising at least one spring locating feature on the rotor rear surface.

9. The rotary valve of claim 6, wherein at least one mirrored pair of spring locating features are located on the rotor rear surface symmetrically with a plane passing through the axis of rotation.

10. A pressure swing adsorption system comprising: a plurality of absorption beds; and a rotary valve having one or more rotors, the rotary valve connected to the plurality of absorption beds and configured to direct flows to the plurality of absorption beds during the pressure swing absorption process; wherein the rotary valve comprises: one or more rotors configured to rotate about an axis of rotation; and at least one compression spring having a spring force with a center of force configured to apply a spring force to the one or more rotors wherein the spring force center of force is located at a predetermined distance greater than zero from the center axis of rotation in order to reduce the amount of torque required to turn the one or more rotors for the spring force.

11. The pressure swing adsorption system of claim 10, the rotary valve further comprising:
   a feed stator comprising:
      a feed stator mating surface;
      a feed stator rear surface; and
      a plurality of feed stator ports connecting between the feed stator mating surface and the feed stator rear surface;
   the one or more rotors comprising:
      a feed rotor engaged with a product rotor;
      wherein the feed rotor comprises a feed rotor mating surface, a feed rotor rear surface, and a plurality of feed rotor ports disposed upon the feed rotor mating surface to direct fluid flow between the plurality of feed stator ports, the feed rotor configured to rotate about an axis of rotation perpendicular to the feed rotor surface; and
      wherein the product rotor comprises a product rotor mating surface, a product rotor rear surface, a product outlet, and a plurality of product rotor ports disposed upon the mating surface to direct fluid flow between the plurality of product stator ports, the product rotor configured to rotate about an axis of rotation perpendicular to the product rotor face;
   a product stator comprising:
      a product stator mating face, a product stator rear face, and a plurality of ports connecting between the product stator mating face and the product stator rear face in rotatable contact with the product rotor; and
      wherein the at least one compression spring is disposed between the feed rotor and the product rotor.

12. The pressure swing adsorption system of claim 11, further comprising at least one spring locating feature positioned on the feed rotor rear face opposite at least one spring locating feature positioned on the product rotor rear face, the spring locating features configured to secure the compression springs between the feed rotor and the product rotor at a fixed position.

13. The pressure swing adsorption system of claim 10, wherein the rotary valve comprises
   a stator housing having ports;
   a rotor comprising ports and a rear surface, the rotor in rotatable contact with the stator housing at an interface about a center axis of rotation;
   a thrust bearing in contact with the stator housing;
   a thrust runner in contact with the thrust bearing; and
   at least one compression spring disposed between the rotor rear surface and the thrust runner.

14. The pressure swing adsorption system of claim 13, further comprising a plurality of spring locating features positioned on the rotor rear face aligned with a plurality of spring locating features positioned on the thrust runner configured to secure the compression springs between the rotor and the thrust runner.

15. The pressure swing adsorption system of claim 10, wherein the spring force center of force minimizes the amount of torque required to turn the one or more rotors for the applied spring force.

* * * * *